(12) United States Patent
Alperin

(10) Patent No.: US 8,819,751 B2
(45) Date of Patent: Aug. 26, 2014

(54) SOCIALLY NETWORKED TELEVISION EXPERIENCE

(75) Inventor: Jordan Alperin, Denver, CO (US)

(73) Assignee: Qwest Communications International Inc., Denver, CO (US)

( * ) Notice: Subject to any disclaimer, the term of this patent is extended or adjusted under 35 U.S.C. 154(b) by 764 days.

(21) Appl. No.: 11/383,620

(22) Filed: May 16, 2006

(65) Prior Publication Data

US 2007/0271586 A1 Nov. 22, 2007

(51) Int. Cl.
*H04N 7/173* (2011.01)
(52) U.S. Cl.
USPC .......................................................... 725/109
(58) Field of Classification Search
CPC .......... H04N 21/4622; H04N 7/17318; H04N 21/4782; H04N 21/8586; H04N 21/4788
USPC ................................ 709/204–207; 725/43, 46
See application file for complete search history.

(56) References Cited

U.S. PATENT DOCUMENTS

| | | | |
|---|---|---|---|
| 4,837,798 A | 6/1989 | Cohen et al. | |
| 5,406,557 A | 4/1995 | Baoudoin | |
| 5,410,691 A | 4/1995 | Taylor | |
| 5,479,411 A | 12/1995 | Klein | |
| 5,524,137 A | 6/1996 | Rhee | |
| 5,633,484 A | 5/1997 | Zancho et al. | |
| 5,689,550 A | 11/1997 | Garson et al. | |
| 5,724,410 A | 3/1998 | Parvulescu et al. | |
| 5,742,905 A | 4/1998 | Pepe et al. | |
| 5,920,835 A | 7/1999 | Huzenlaub et al. | |
| 5,937,162 A | 8/1999 | Funk et al. | |
| 5,974,449 A | 10/1999 | Chang et al. | |
| 6,014,429 A | 1/2000 | LaPorta et al. | |
| 6,081,830 A * | 6/2000 | Schindler | ...................... 709/204 |
| 6,094,681 A | 7/2000 | Shaffer et al. | |
| 6,154,772 A * | 11/2000 | Dunn et al. | .................... 725/114 |
| 6,173,259 B1 | 1/2001 | Bijl et al. | |
| 6,345,279 B1 | 2/2002 | Li et al. | |
| 6,366,651 B1 | 4/2002 | Griffith et al. | |
| 6,407,680 B1 | 6/2002 | Lai et al. | |

(Continued)

FOREIGN PATENT DOCUMENTS

WO PCT-WO 97/23082 6/1997

OTHER PUBLICATIONS

U.S. Appl. No. 11/228,446, filed Sep. 15, 2005, Jordan Alperin.

(Continued)

*Primary Examiner* — Benjamin R Bruckart
*Assistant Examiner* — Anthony Bantamoi
(74) *Attorney, Agent, or Firm* — Swanson & Bratschun, L.L.C.

(57) ABSTRACT

In one embodiment, a system for providing social interaction opportunities for people watching television is presented. The system includes: a television data source which transmits television data streams for reception by end devices, each end device being represented by an equipment code; a plurality of end devices, including a first user's end device and a second user's end device, each end device configured to receive a television data streams, and each user represented by an identifier code; and an interactive-information server configured to: store, at the first user's behest, the identifier code of the second user; monitor which of the television data streams is being received by the first end device; monitor which of the television data streams is being received by the second end device; and notify the first user when the first end device and the second end device are receiving the same television data stream.

18 Claims, 13 Drawing Sheets

(56) References Cited

U.S. PATENT DOCUMENTS

| | | |
|---|---|---|
| 6,421,733 B1 | 7/2002 | Tso et al. |
| 6,438,221 B1 | 8/2002 | Lee et al. |
| 6,442,589 B1 | 8/2002 | Takahashi et al. |
| 6,442,606 B1 | 8/2002 | Subbaroyan et al. |
| 6,459,776 B1 | 10/2002 | Aktas et al. |
| 6,463,463 B1 | 10/2002 | Godfrey et al. |
| 6,483,899 B2 | 11/2002 | Agraharam et al. |
| 6,556,217 B1 | 4/2003 | Makipaa et al. |
| 6,564,264 B1 | 5/2003 | Creswell et al. |
| 6,631,181 B1 | 10/2003 | Bates et al. |
| 6,675,261 B2 | 1/2004 | Shandony |
| 6,694,004 B1 | 2/2004 | Knoerle et al. |
| 6,754,904 B1* | 6/2004 | Cooper et al. ............... 725/32 |
| 6,768,789 B1 | 7/2004 | Wilk |
| 6,775,658 B1 | 8/2004 | Zothner |
| 6,782,253 B1 | 8/2004 | Shteyn et al. |
| 6,799,174 B2 | 9/2004 | Chipman et al. |
| 6,801,793 B1 | 10/2004 | Aarnio et al. |
| 6,816,582 B2 | 11/2004 | Levine |
| 6,826,173 B1 | 11/2004 | Kung et al. |
| 6,826,407 B1 | 11/2004 | Helferich |
| 6,832,259 B2 | 12/2004 | Hymel et al. |
| 6,832,377 B1 | 12/2004 | Havemose |
| 6,879,838 B2 | 4/2005 | Rankin et al. |
| 6,882,709 B1 | 4/2005 | Sherlock et al. |
| 6,938,087 B1 | 8/2005 | Abu-Samaha |
| 6,964,014 B1 | 11/2005 | Parish |
| 6,977,993 B2 | 12/2005 | Starbuck et al. |
| 6,988,128 B1 | 1/2006 | Alexander et al. |
| 7,013,331 B2 | 3/2006 | Das |
| 7,069,301 B2 | 6/2006 | Jerbi et al. |
| 7,069,309 B1 | 6/2006 | Dodrill et al. |
| 7,072,056 B1 | 7/2006 | Greaves et al. |
| 7,076,734 B2* | 7/2006 | Wolff et al. ............... 715/720 |
| 7,106,473 B2 | 9/2006 | Sekiguchi |
| 7,120,870 B1 | 10/2006 | Nakamura |
| 7,188,073 B1 | 3/2007 | Tam et al. |
| 7,212,543 B1 | 5/2007 | Arwald et al. |
| 7,212,614 B1 | 5/2007 | Burg et al. |
| 7,219,163 B2 | 5/2007 | Robinson et al. |
| 7,224,774 B1 | 5/2007 | Brown et al. |
| 7,272,662 B2 | 9/2007 | Chesnais et al. |
| 7,277,529 B1 | 10/2007 | Wuthnow et al. |
| 7,295,752 B1 | 11/2007 | Jain et al. |
| 7,310,329 B2 | 12/2007 | Vieri et al. |
| 7,310,625 B2 | 12/2007 | Wu |
| 7,383,308 B1 | 6/2008 | Groves et al. |
| 7,385,875 B2 | 6/2008 | May et al. |
| 7,551,727 B2 | 6/2009 | Howell et al. |
| 7,587,033 B2 | 9/2009 | Crago et al. |
| 7,596,369 B2 | 9/2009 | Alperin et al. |
| 7,688,962 B1 | 3/2010 | Knoerie et al. |
| 8,078,476 B2 | 12/2011 | Alperin et al. |
| 8,095,664 B2 | 1/2012 | Yamaguchi et al. |
| 8,320,535 B2 | 11/2012 | Alperin et al. |
| 2002/0026457 A1 | 2/2002 | Jensen |
| 2002/0032589 A1 | 3/2002 | Shah |
| 2002/0075519 A1 | 6/2002 | Konsella et al. |
| 2002/0076027 A1 | 6/2002 | Bernnan et al. |
| 2002/0082030 A1 | 6/2002 | Berndt et al. |
| 2002/0087704 A1 | 7/2002 | Chesnais et al. |
| 2002/0098831 A1 | 7/2002 | Castell et al. |
| 2002/0102965 A1 | 8/2002 | Mandahl et al. |
| 2002/0111991 A1 | 8/2002 | Wood et al. |
| 2002/0128036 A1 | 9/2002 | Yach et al. |
| 2002/0144273 A1* | 10/2002 | Reto ............... 725/86 |
| 2002/0156871 A1 | 10/2002 | Munarriz et al. |
| 2002/0169823 A1 | 11/2002 | Coulombe et al. |
| 2002/0170067 A1 | 11/2002 | Norstrom et al. |
| 2002/0174194 A1 | 11/2002 | Mooney et al. |
| 2002/0194150 A1 | 12/2002 | Bates et al. |
| 2003/0088633 A1 | 5/2003 | Chiu et al. |
| 2003/0097262 A1 | 5/2003 | Nelson |
| 2003/0101450 A1* | 5/2003 | Davidsson et al. ............... 725/32 |
| 2003/0120717 A1 | 6/2003 | Callaway et al. |
| 2003/0147369 A1 | 8/2003 | Singh et al. |
| 2003/0149646 A1 | 8/2003 | Chen et al. |
| 2003/0172139 A1 | 9/2003 | Srinivasan et al. |
| 2003/0172175 A1 | 9/2003 | McCormack et al. |
| 2003/0177408 A1 | 9/2003 | Fields et al. |
| 2004/0044663 A1 | 3/2004 | Horompoly |
| 2004/0054719 A1 | 3/2004 | Daigle et al. |
| 2004/0058673 A1 | 3/2004 | Irlam et al. |
| 2004/0075698 A1 | 4/2004 | Gao et al. |
| 2004/0091089 A1 | 5/2004 | Wyn |
| 2004/0170155 A1 | 9/2004 | Omar et al. |
| 2004/0199665 A1 | 10/2004 | Omar et al. |
| 2004/0268265 A1 | 12/2004 | Berger |
| 2005/0015311 A1 | 1/2005 | Frantz et al. |
| 2005/0015443 A1 | 1/2005 | Levine et al. |
| 2005/0018653 A1 | 1/2005 | Phillips et al. |
| 2005/0033806 A1* | 2/2005 | Harvey et al. ............... 709/204 |
| 2005/0037762 A1 | 2/2005 | Gurbani et al. |
| 2005/0053206 A1 | 3/2005 | Chingon et al. |
| 2005/0075097 A1 | 4/2005 | Lehikoinen et al. |
| 2005/0086282 A1 | 4/2005 | Anderson et al. |
| 2005/0089149 A1 | 4/2005 | Elias |
| 2005/0091327 A1 | 4/2005 | Koch |
| 2005/0101343 A1 | 5/2005 | Hsiao |
| 2005/0144557 A1 | 6/2005 | Li et al. |
| 2005/0201533 A1 | 9/2005 | Emam et al. |
| 2005/0235307 A1* | 10/2005 | Relan et al. ............... 725/14 |
| 2005/0246666 A1 | 11/2005 | Kalinoski et al. |
| 2005/0254635 A1 | 11/2005 | Koretsky et al. |
| 2005/0262542 A1* | 11/2005 | DeWeese et al. ............... 725/106 |
| 2006/0017983 A1 | 1/2006 | Syri et al. |
| 2006/0026302 A1 | 2/2006 | Bennett et al. |
| 2006/0095868 A1 | 5/2006 | Sawada et al. |
| 2006/0104293 A1 | 5/2006 | Kopp et al. |
| 2006/0104430 A1 | 5/2006 | Kirkland et al. |
| 2006/0104431 A1 | 5/2006 | Emery et al. |
| 2006/0123082 A1 | 6/2006 | Digate et al. |
| 2006/0156251 A1 | 7/2006 | Suhail et al. |
| 2006/0168065 A1 | 7/2006 | Martin |
| 2006/0184624 A1* | 8/2006 | Thukral ............... 709/204 |
| 2006/0206941 A1 | 9/2006 | Collins |
| 2006/0218575 A1* | 9/2006 | Blair ............... 725/28 |
| 2006/0250991 A1 | 11/2006 | Jabri et al. |
| 2006/0265397 A1 | 11/2006 | Bryan et al. |
| 2006/0265427 A1 | 11/2006 | Cohen et al. |
| 2006/0277316 A1 | 12/2006 | Wang et al. |
| 2007/0016643 A1 | 1/2007 | Boss et al. |
| 2007/0058569 A1 | 3/2007 | McMenamin et al. |
| 2007/0079010 A1 | 4/2007 | Heredia et al. |
| 2007/0097394 A1 | 5/2007 | Zaima et al. |
| 2007/0104184 A1 | 5/2007 | Ku et al. |
| 2007/0139513 A1* | 6/2007 | Fang ............... 348/14.01 |
| 2007/0174426 A1 | 7/2007 | Ahuja et al. |
| 2007/0198648 A1 | 8/2007 | Allen et al. |
| 2007/0239833 A1 | 10/2007 | Alperin et al. |
| 2007/0239880 A1 | 10/2007 | Alperin et al. |
| 2007/0239895 A1 | 10/2007 | Alperin et al. |
| 2008/0177616 A1 | 7/2008 | Nemirofsky et al. |

OTHER PUBLICATIONS

U.S. Appl. No. 11/255,089, filed Oct. 19, 2005, Jordan Alperin et al.
U.S. Appl. No. 11/266,011, filed Nov. 2, 2005, Jordan Alperin et al.
U.S. Appl. No. 11/293,028, filed Dec. 2, 2005, Jordan Alperin et al.
U.S. Appl. No. 11/292,801, filed Dec. 2, 2005, Jordan Alperin et al.
U.S. Appl. No. 11/399,096, filed Apr. 5, 2006, Jordan Alperin et al.
U.S. Appl. No. 11/399,585, filed Apr. 5, 2006, Jordan Alperin et al.
U.S. Appl. No. 11/399,097, filed Apr. 5, 2006, Jordan Alperin et al.
U.S. Appl. No. 11/399,098, filed Apr. 5, 2006, Jordan Alperin et al.
U.S. Appl. No. 11/399,584, filed Apr. 5, 2006, Jordan Alperin.
U.S. Appl. No. 11/400,643, filed Apr. 6, 2006, Jordan Alperin et al.
U.S. Appl. No. 11/400,616, filed Apr. 6, 2006, Jordan Alperin et al.
U.S. Appl. No. 11/400,644, filed Apr. 6, 2006, Jordan Alperin et al.
Good Technology, Inc., "GoodLlink Enterprise Edition 4.5", Published in: US, Product Brochure, 4 pages.
Koontz, Alan "Find in Page Script", Oct. 13, 1969, Dynamic Drive, "http:/www.dynamicdrive.com/dynamicindex11/findpage.htm", 2 pages.

(56) References Cited

OTHER PUBLICATIONS

The Web Design Resource, "Manipulating Font Size and Color", Jun. 27, 1998, The Web Design Resource, 2 pages.
U.S. Appl. No. 11/228,446, Advisory Action dated Jan. 8, 2009, 3 pages.
U.S. Appl. No. 11/228,446, Advisory Action dated Oct. 1, 2009, 3 pages.
U.S. Appl. No. 11/228,446, Final Office Action dated May 18, 2010, 15 pages.
U.S. Appl. No. 11/228,446, Final Office Action dated Jul. 24, 2009, 11 pages.
U.S. Appl. No. 11/228,446; Final Office Action dated Oct. 24, 2008, 6 pages.
U.S. Appl. No. 11/228,446, Office Action dated Jan. 4, 2010, 17 pages.
U.S. Appl. No. 11/228,446, Office Action dated Jun. 3, 2008, 13 pages.
U.S. Appl. No. 11/228,446, Office Action dated Mar. 3, 2009, 12 pages.
U.S. Appl. No. 11/255,089, Final Office Action dated Sep. 24, 2009.
U.S. Appl. No. 11/255,089, Appeal Brief dated Apr. 26, 2010, 17 pages.
U.S. Appl. No. 11/255,089, Advisor Action dated Dec. 15, 2009, 3 pages.
U.S. Appl. No. 11/255,089, Office Action dated Mar. 10, 2009, 17 pages.
U.S. Appl. No. 11/255,089, Office Action dated Oct. 8, 2008, 18 pages.
U.S. Appl. No. 11/266,011, Office Action dated Dec. 22, 2008, 12 pages.
U.S. Appl. No. 11/266,011, Office Action dated Aug. 19, 2010, 19 pages.
U.S. Appl. No. 11/266,011, Advisor Action dated Apr. 23, 2010, 2 pages.
U.S. Appl. No. 11/266,011, Office Action dated Jun. 10, 2009, 12 pages.
U.S. Appl. No. 11/266,011, Final Office Action dated Jan. 28, 2010, 11 pages.
U.S. Appl. No. 11/292,801, Office Action dated Mar. 3, 2009, 9 pages.
U.S. Appl. No. 11/293,028, Advisory Action dated Jul. 6, 2009, 19 pages.
U.S. Appl. No. 11/293,028, Advisory Action dated May 23, 2008., 3 pages.
U.S. Appl. No. 11/293,028, Final Office Action dated Apr. 15, 2009, 12 pages.
U.S. Appl. No. 11/293,028, Final Office Action dated Mar. 17, 2008, 11 pages.
U.S. Appl. No. 11/293,028, Office Action dated Aug. 13, 2008, 9 pages.
U.S. Appl. No. 11/293,028, Office Action dated Nov. 14, 2007, 11 pages.
U.S. Appl. No. 11/293,028, Notice of Allowance dated Oct. 30, 2009, 16 pages.
U.S. Appl. No. 11/399,096, Final Office Action dated Jun. 17, 2009, 11 pages.
U.S. Appl. No. 11/399,096, Office Action dated Dec. 7, 2009, 10 pages.
U.S. Appl. No. 11/399,096, Office Action dated Jan. 22, 2009, 14 pages.
U.S. Appl. No. 11/399,096, Final Office Action dated May 24, 2010, 12 pages.
U.S. Appl. No. 11/399,098, Notice of Allowance dated Jun. 2, 2009, 6 pages.
U.S. Appl. No. 11/399,098, Office Action dated Aug. 25, 2008, 13 pages.
U.S. Appl. No. 11/399,098, Terminal Disclaimer dated Nov. 25, 2008, 1 page.
U.S. Appl. No. 11/399,098, Requirement for Election/Restriction dated Feb. 25, 2009, 6 pages.
U.S. Appl. No. 11/399,098, Response to Requirement for Election/Restriction dated Mar. 11, 2009, 10 pages.
U.S. Appl. No. 11/399,098, filed Apr. 5, 2006, now US Patent No. 7,596,369, 16 pages.
U.S. Appl. No. 11/399,585, Office Action dated Mar. 24, 2009, 16 pages.
U.S. Appl. No. 11/399,585, Advisory Action dated Jan. 25, 2010, 3 pages.
U.S. Appl. No. 11/399,585, Final Office Action dated Nov. 4, 2009, 10 pages.
U.S. Appl. No. 11/399,585, Non-Final Office Action dated Sep. 21, 2010, 15 pages.
U.S. Appl. No. 11/400,643, Final Office Action dated Jul. 27, 2009, 18 pages.
U.S. Appl. No. 11/400,643, Office Action dated Jan. 9, 2009, 17 pages.
U.S. Appl. No. 11/400,643, Advisory Action dated Jan. 19, 2009, 3 pages.
U.S. Appl. No. 11/400,644, Office Action dated Jan. 21, 2009, 16 pages.
Www.Comcast.Net/Storage, "Comcast on Line Storage", 2005, Published in: US, Internet Website, 1 page.
www.ibackup.com, "Flexible Storage Solutions for the Internet Age", Nov. 2005, Published in: US, Internet Website, 1 page.
www.mydocsonline, "File and Data Storage"., Nov. 2005, Published in: US, Internet Website, 2 pages.
www.streamload.com, "Streamload—Freedom for Your Digital Lifestyle", Nov. 2005, Published in: US, Internet Website, 1 page.
www.xdrive.Com, "Secure on Line Storage", Nov. 2005, Published in : US, Internet Website, 2 pages.
U.S. Appl. No. 11/400,616, Final Office Action dated Feb. 1, 2010, 16 pages.
U.S. Appl. No. 11/400,616, Office Action dated Jul. 13, 2009, 21 pages.
U.S. Appl. No. 11/399,097, Final Office Action dated Sep. 1, 2010, 10 pages.
U.S. Appl. No. 11/399,097, Office Action dated Mar. 26, 2010, 12 pages.
U.S. Appl. No. 11/399,097, Requirement for Election/Restriction dated Jan. 26, 2010, 6 pages.
U.S. Appl. No. 11/399,097, Response to Requirement for Election/Restriction dated Feb. 22, 2010, 1 page.
U.S. Appl. No. 11/399,584, Examiner's Answer to Appeal Brief dated Jun. 22, 2009, 16 pages.
U.S. Appl. No. 11/399,584, Appeal Brief dated Mar. 12, 2009, 24 pages.
U.S. Appl. No. 11/399,584, Advisory Action dated Dec. 18, 2008, 3 pages.
U.S. Appl. No. 11/399,584, Final Office Action dated Sep. 12, 2008, 12 pages.
U.S. Appl. No. 11/399,584, Office Action dated Mar. 6, 2008, 10 pages.
U.S. Appl. No. 11/399,096, Office Action dated Oct. 27, 2010, 11 pages.
U.S. Appl. No. 11/400,643, Office Action dated Mar. 7, 2011, 21 pages.
U.S. Appl. No. 11/399,585, Final Office Action dated Feb. 8, 2011, 23 pages.
U.S. Appl. No. 11/266,011, Final Office Action dated Feb. 4, 2011, 25 pgs.
U.S. Appl. No. 11/399,096, Final Office Action dated Feb. 11, 2011, 15 pages.
U.S. Appl. No. 11/228,446, Office Action dated Feb. 22, 2011, 20 pages.
Alan Koontz, "Find in Page Script", Jun. 2003, Dynamic Drive, http://www.dynamicdrive.com/dynamicindex11/findpage.htm, 7 pages.
Brian Suda et al., "Enhance Usability by Highlighting Search Terms," A List Apart, http://www.alistapart.com/articles/searchhighlight, 4 pages.
Chris McC, "Determining if span/div is visible or not," Jun. 2004, JavaScript and AJAX Forum, http://www.webmasterworld.com/forum91/1935.htm, 4 pages.

(56) References Cited

OTHER PUBLICATIONS

Vic Phillips, web site "http://homepgae.ntlworld.com/vwphillips/SearchForText.htm" titled "JavaScript Code for Search for Text", Jan. 15, 2005, 5 pages.
Ashok Hariharan, "DHTML Text Marker—An Experiment," Jul. 2002, evolt.org, http://evolt.org/node/29028, 8 pages.
U.S. Appl. No. 11/400,643, Office Action dated Oct. 14, 2010, 19 pages.
U.S. Appl. No. 11/399,097, Office Action dated Jan. 11, 2011, 11 pages.
U.S. Appl. No. 11/400,616, Office Action dated Mar. 16, 2011, 16 pages.
U.S. Appl. No. 11/399,096, Notice of Panel Decision from Pre-Appeal Brief Review dated May 20, 2011, 2 pages.
U.S. Appl. No. 11/399,096, Office Action dated Jul. 12, 2011, 14 pages.
U.S. Appl. No. 11/399,585, Office Action dated Jul. 18, 2011, 20 pages.
U.S. Appl. No. 11/400,643; Notice of Panel Decision dated Jul. 11, 2011; 2 pages.
U.S. Appl. No. 11/400,643 Non Final Office Action dated Jul. 28, 2011; 20 pages.
U.S. Appl. No. 11/400,616 Non Final Office Action dated Aug. 18, 2011; 35 pages.
U.S. Appl. No. 11/399,584; Final Rejection dated Dec. 13, 2012; 23 pages.
U.S. Appl. No. 11/228,446; Issue Notification dated May 30, 2012; 1 page.
U.S. Appl. No. 11/400,643; Issue Notification dated Jun. 13, 2012; 1 page.
U.S. Appl. No. 11/400,616; Notice of Allowance dated Jul. 3, 2012; 17 pages.
U.S. Appl. No. 11/400,616; Corrected Notice of Allowability dated Sep. 7, 2012; 11 pages.
U.S. Appl. No. 11/399,584; Non-Final Rejection dated Sep. 19, 2012; 24 pages.
U.S. Appl. No. 11/400,616; Corrected Notice of Allowability dated Oct. 26, 2012; 12 pages.
U.S. Appl. No. 11/400,616; Issue Notification dated Nov. 7, 2012; 1 page.
U.S. Appl. No. 11/228,446; Examiner-Initiated Interview Summary dated Nov. 10, 2011; 2 pages.
U.S. Appl. No. 11/228,446; Interview Summary dated Nov. 28, 2011; 3 pages.
U.S. Appl. No. 11/228,446; Notice of Allowance dated Nov. 28, 2011; 17 pages.
U.S. Appl. No. 11/399,096; Final Office Action dated Dec. 6, 2011; 15 pages.
U.S. Appl. No. 11/399,585; Non Final Office Action dated Jan. 4, 2012; 19 pages.
U.S. Appl. No. 11/400,643 Notice of Allowance Dec. 27, 2011; 26 pages.
U.S. Appl. No. 11/399,097; Supplemental Notice of Allowability dated Oct. 31, 2011; 5 pages.
U.S. Appl. No. 11/388,585; Final Rejection dated May 1, 2012; 35 pages.
U.S. Appl. No. 11/266,011; Issue Notification dated Apr. 11, 2012; 1 page.
U.S. Appl. No. 11/399,584; Decision on Appeal dated Feb. 9, 2012; 9 pages.
U.S. Appl. No. 11/400,616 CT; Non Final Office Action dated Mar. 8, 2012; 26 pages.
U.S. Appl. No. 11/400,643; Notice of Allowance dated Mar. 8, 2012; 14 pages.
U.S. Appl. No. 11/255,089; Withdrawal of Notice of Abandonment dated Oct. 10, 2013; 2 pages.
U.S. Appl. No. 11/255,089; Non-Final Rejection dated Nov. 22, 2013; 35 pages.
U.S. Appl. No. 11/255,089; Notice of Panel Decision dated Jul. 1, 2013; 9 pages.
U.S. Appl. No. 11/399,584; Non-Final Rejection dated Sep. 26, 2013; 22 pages.
U.S. Appl. No. 11/399,584; Final Rejection dated Jan. 16, 2014; 21 pages.
U.S. Appl. No. 11/255,089; Notice of Allowance dated Mar. 31, 2014; 36 pages.

\* cited by examiner

| ID Code | Equip. Code | CID Code | CID IP Addr. | TV Data Stream | Relat. ID Codes | Relat. Equip. Code |
|---|---|---|---|---|---|---|
| 0052 | 16.3.105.108 | wc365 | | RMRCNBC104 | 0144 | 11.2.101.101 |
| | | | | | 5280 | 13.3.121.171 |
| | | | | | 0069 | |
| | | | | | 1234 | 19.156.185.123 |
| | | | | | 0058 | 12.4.60.189 |
| 0053 | | | | | 0268 | 55.125.240.3 |
| | | | | | 5180 | 40.53.231.25 |
| | | | | | 0879 | |
| | | | | | 6789 | 9.63.251.123 |
| 0054 | 5.123.56.187 | voip12 | | ECRESPN135 | 1384 | 138.56.231.5 |
| | | | | | 6431 | 164.25.89.2 |
| 0055 | 5.123.56.245 | | | WCRNHSN184 | | |
| 0056 | | | | | | |
| 0057 | 10.5.156.138 | | | WCRNHSN184 | | |
| 0058 | 12.4.60.189 | pc | 12.4.60.190 | RMRCABC109 | 0004 | |
| | | | | | 0369 | 203.98.65.32 |
| | | | | | 0052 | 16.3.105.108 |
| | | | | | 5821 | 205.78.45.12 |
| | | | | | 6934 | |
| | | | | | 8697 | 169.69.69.1 |
| 0059 | 126.15.1.218 | | | WCRFOXN113 | | |
| 0060 | 8.1.168.101 | mac | 8.1.168.102 | CTRNCNN164 | 1004 | 13.69.13.69 |
| | | | | | 6057 | 135.79.246.8 |

SOCIALLY NETWORKED TELEVISION EXPERIENCE

BACKGROUND OF THE INVENTION

Watching television is a common activity by many people. Some television shows, both popular and less well known, are socially discussed intensely by watchers for many days following their broadcast. These shows include soap operas, reality television shows, award shows, sporting events, and other types of programs. However, the actual watching of the show is usually somewhat less social and involves merely watching the show as an individual or a small group.

Currently, if a watcher wants to discuss a television show with another person while the show is occurring, the watcher must communicate with the other person by some mode initiated on their own, without knowledge of whether or not the other person is watching the same show, or if the other person is even interested in communicated regarding the show. The systems and methods of the present invention provide solutions to these and other problems.

SUMMARY OF THE INVENTION

In one embodiment, a system for providing social interaction opportunities for people watching television is provided. The system may have a television data source, a plurality of end devices, and an interactive-information server. The television data source may be configured to transmit at least one of a plurality of television data streams for reception by a plurality of end devices. Each end device may be represented by an equipment code. The plurality of end devices may include a first end device used by a first user and a second end device used by a second user. Each end device may be configured to receive at least one of the plurality of television data streams. Each user may be represented by an identifier code. In some embodiments, the system may also have a communication input device. The communication input device may be associated with at least one end device, and may be configured to communicate with at least one end device which may not be associated with the communication input device.

The interactive-information server may be configured to store, at the direction of the first user, an identifier code representing the second user; monitor which of the plurality of television data streams is being received by the first end device; monitor which of the plurality of television data streams is being received by the second end device; and notify the first user when the same television data stream is being received by both the first end device and the second end device. In some embodiments, the interactive-information server may be further configured to determine the first user is using the first end device and that the second user is using the second end device. In some embodiments, the interactive-information server may also be configured to notify the first user if a communication input device is associated with the second end device.

In another embodiment, a system for providing social interaction opportunities for people watching television is provided. The system may have a television data source, a plurality of end devices, and an interactive-information server. The television data source may be configured to transmit at least one of a plurality of television data streams for reception by a plurality of end devices. Each end device may be represented by an equipment code. The plurality of end devices may include a first end device used by a first user and a second end device used by a second user. Each end device may be configured to receive at least one of the plurality of television data streams. Each user may be represented by an identifier code. In some embodiments, the system may also have a communication input device. The communication input device may be associated with at least one end device, and may be configured to communicate with at least one end device which may not be associated with the communication input device.

The interactive-information server may be configured to store, at the direction of the first user, an identifier code representing the second end user; monitor which of the plurality of television data streams is being received by the second end device; and notify the first user of which television data stream is being received by the second end device. In some embodiments, the interactive-information server may be further configured to determine the first user is using the first end device and that the second user is using the second end device. In some embodiments, the interactive-information server may also be configured to notify the first user if a communication input device is associated with the second end device.

In another embodiment, a method for providing social interaction opportunities for people watching television is provided. The method may have steps for storing, at the direction of a first user of a first end device, an identifier code representing a second user; monitoring which of a plurality of television data streams is being received by the first end device; monitoring which of the plurality of television data streams is being received by a second end device used by the second user; and notifying the first user of which television data stream is being received by the second end device. In some embodiments, the method may also have a step for notifying the first user when the same television data stream is being received by both the first end device and the second end device. In some embodiments, the method may also have a step for notifying the first user if a communication input device is associated with the second end device.

BRIEF DESCRIPTION OF THE DRAWINGS

The present disclosure is described in conjunction with the appended figures.

Figure 1:
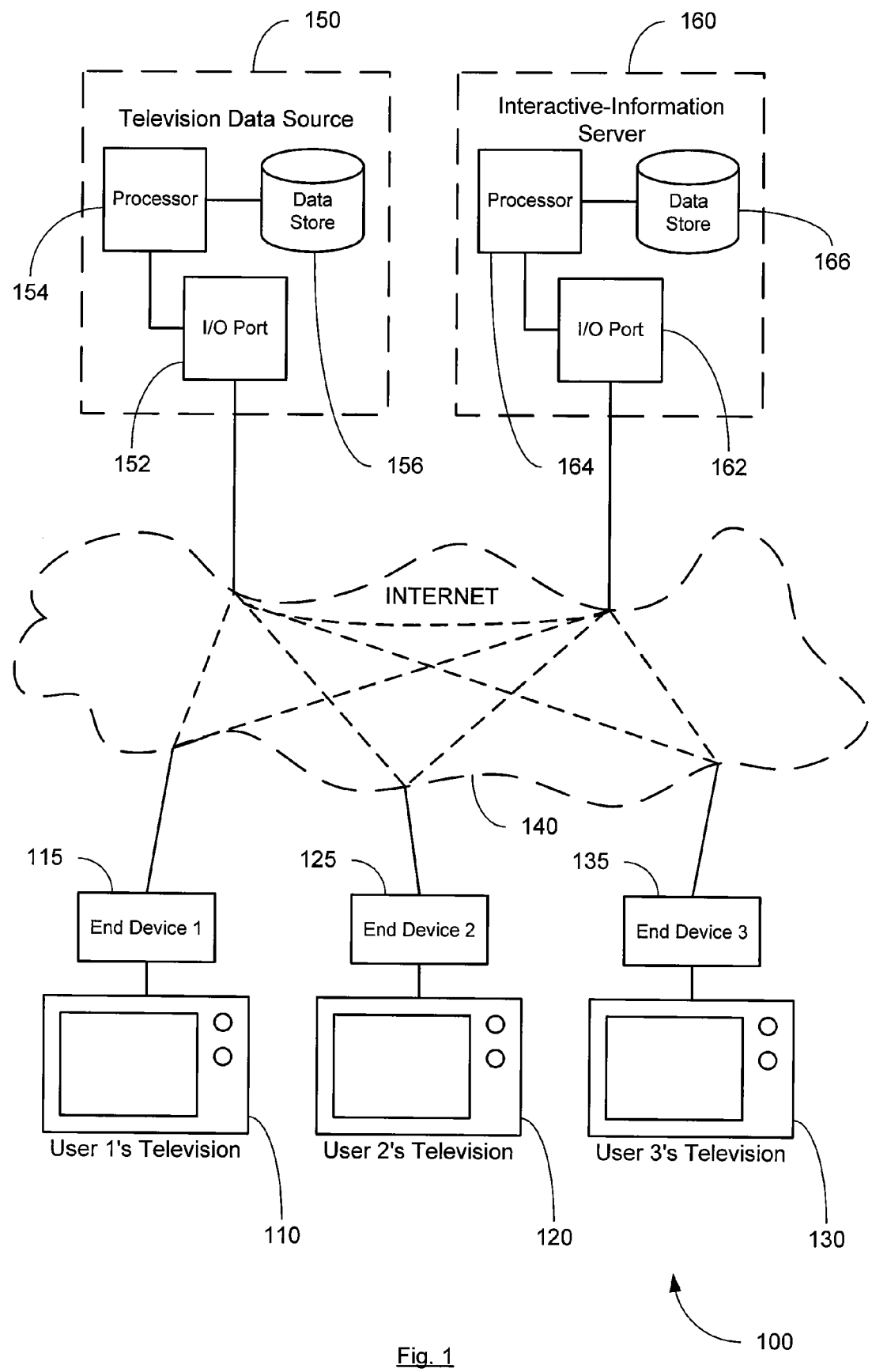
FIG. 1 is a block diagram of one system which provides social interaction opportunities for people watching television, having multiple televisions and end devices, as well as a television data source and an interactive-information server which are not in direct communication with each other.

In the appended figures, similar components and/or features may have the same reference label. Further, various components and/or features of the same type may be distinguished by following the reference label by a letter that distinguishes among the similar components and/or features. If only the first reference label is used in the specification, the description is applicable to any one of the similar components and/or features having the same first reference label irrespective of the letter suffix.

DETAILED DESCRIPTION OF THE INVENTION

The ensuing description provides preferred exemplary embodiments only, and is not intended to limit the scope, applicability or configuration of the disclosure. Rather, the ensuing description of the preferred exemplary embodiments will provide those skilled in the art with an enabling description for implementing a preferred exemplary embodiment. It is understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination corresponds to a return of the function to the calling function or the main function.

The term "machine-readable medium" includes, but is not limited to portable or fixed storage devices, optical storage devices, wireless channels and various other mediums capable of storing, containing or carrying instructions and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor or processors may perform the necessary tasks.

In one embodiment, a system for providing social interaction opportunities for people watching television is provided. The system may have a television data source ("TDS"), a plurality of end devices, and an interactive-information server ("IIS"). Some embodiments may also have at least one communication input device.

The TDS may be configured to transmit at least one of a plurality of television data streams for reception by the plurality of end devices, wherein each end device is represented by an equipment code. The TDS may be a computer configured to convert digital or analog television signals into television data streams. For instance, a computer may receive traditional television signals from a source such as broadcast, cable or satellite and convert such signals into television data streams. In some embodiments, each traditional television channel will be converted into a single television data stream. In some embodiments, the TDS may be a Television over Internet Protocol ("TVoIP") server. Transmission of the television data streams may possibly occur over the internet, an intranet, and/or another medium capable of carrying transmitted data to end devices.

The end devices, including a first end device used by a first user and a second end device used by a second user, may each be configured to receive at least one of the plurality of television data streams. Each user may be represented by an identifier code and the end devices may be, for example, a television set-top box configured to receive at least one television data stream and convert the data stream into a signal that may be received and displayed by a television. The television set-top box may convert a television data stream into separate audio and video signals, where the audio signals, once converted, may be mono, stereo, or multi-channel signals. The video signals, once converted, may be a composite, s-video, or component signal. Some end devices may be TVoIP ready televisions that may or may not conduct similar conversion operations to display the television data streams. Other possible end devices include personal computers and portable electronic devices. Each end device may be represented by an equipment code, and the equipment code may be an alpha-numeric string. The alpha-numeric string may be a Media Access Control address ("MAC address") or an Internet Protocol address ("IP address").

The IIS may be configured to store, at the direction of the first user, an identifier code representing the second user; monitor which of the plurality of television data streams is being received by the first end device; monitor which of the plurality of television data streams is being received by the second end device used by the second user represented by the identifier code; notify the first user which television data stream is being received by the second end device; and notify the first user when the same television data stream is being received by both the first end device and the second end device. The IIS may be a computer in communication with the TDS and/or a computer in communication with the plurality of end devices. The identifier code may be alpha-numeric string, and in some embodiments may be a username, e-mail address, handle, or alias. Notifying the first user when the same television data stream is being received by both the first end device and the second end device may involve transmitting notification data for reception by the second end device. In some embodiments the IIS may further be configured to determine that the first end device is being used by the first user, and that the second end device is being used by the second user.

In some embodiments, a communication input device may be associated with at least one end device and may be configure to communicate with at least one end device which is not associated with the communication input device. In some embodiments, the communication input device may be integral with the end device it is associated with. This may especially be the case in embodiments where the end device is a personal computer or an entertainment console. The IIS may be configured, in embodiments employing communication input devices, to notify the first user if a communication input device is associated with the second end device.

In another embodiment, a method for providing social interaction opportunities for people watching television is provided. The method may have steps for storing, at the direction of a first user of a first end device, an identifier code representing a second user; monitoring which of a plurality of television data streams is being received by the first end device; monitoring which of the plurality of television data streams is being received by a second end device used by the second user; and notifying the first user of which television data stream is being received by the second end device. In some embodiments, the method may also have a step for notifying the first user when the same television data stream is being received by both the first end device and the second end device. In some embodiments, the method may also have a step for notifying the first user if a communication input device is associated with the second end device.

Turning now to FIG. 1, a block diagram is shown of one system 100 which provides social interaction opportunities for people watching television. The system includes multiple televisions 110, 120, 130, each used by different users. Each of these televisions is respectively associated with multiple end devices 115, 125, 135, which may be set-top boxes. Each of the end devices 115, 125, 135 are in communication with the Internet 140. Through the Internet 140, the end devices 115, 125, 135 are in communication with both a TDS 150 and an IIS 160. Both the TDS 150 and the IIS 160 may have an input/output ("I/O") port 152, 162, a processor 154, 164 and a data store 156, 166.

In this embodiment, methods and systems of the invention may be used to provide social interaction opportunities for people watching television. For example, each user may be receiving a different television data stream from the TDS 150. The TDS 150 may store television data on its data store 156, and transmit the television data streams from its I/O port 152, over the Internet 140, for reception by the end device 115, 125, 135. Each of the end devices 115, 125, 135 may receive the different television data stream and convert it into a video signal and audio signal. The audio and video signals may then be transmitted from the end devices 115, 125, 135 to each respective television 110, 120, 130 for perception by users of the televisions 110, 120, 130.

In one example, a first user may be using the first end device 115 to watch television 110. A second user may be using the first end device 125 to watch television 120. The IIS 160, may, at the direction of the first user, store an identifier code representing the second user. This may occur when the first user logs into a web-site or other user interface which may interact with the IIS 160. Such an interaction might occur through the use of a personal computer or an interface accessed through an end device and/or a television. It may also occur through the use of a portable electronic device such as a mobile phone, personal data assistant, BlackBerry™ or GoodLink™ device.

Once the first user begins communication with the IIS 160, the user may submit identifier codes of other possible users of end devices. These other users may be users with which the first user may desire to communicate with regarding television data streams watched by the other users. Once identifier codes have been submitted by the first user, they may be stored by the IIS 160 in the data store 166 as being related to the first user. The data store 166 will thus possibly contain a listing of users, each possibly identified by an identifier code, and each also having a list of identifier codes associated therewith that represent other users. For the purpose of an example, in one embodiment the first user may store identifier codes for a second user using end device 125 and a third user using end device 135.

IIS 160 may monitor which television data streams are being transmitted by TDS 150, and being received by end devices 115, 125, 135. Alternatively, IIS 160 may monitor end devices 115, 125, 135 to determine which television data streams are being received by end devices 115, 125, 135. IIS 160 may continually update data store 166 with data representing what different television data streams are being received by end devices 115, 125, 135. The IIS 160 may determine that the which users are using which end devices, and temporarily store the identifier code representing the user which is using end device 115, 125, 135. In this way, the IIS 160 may have stored at data store 166 a list of identifier codes representing users which are using end devices. For each user using an end device the data store 166 may also contain a list of equipment codes identifying the end device being used by the users; a list of related identifier codes for each user; and another list of equipment codes, wherein each equipment code in this list identifies the end device used by the related users.

Figure 2:
FIG. 2 is a portion of a sample database of information that might be stored by an interactive-information server.

FIG. 2 is an example of a portion of data 200 which might be stored at IIS 160 in some embodiments. In column 210 the identifier code representing a user is stored. In column 220 the equipment code representing an end device used by the user is stored. In this particular embodiment the equipment code is shown as the end device's IP address, though other identifiers are possible. Note that in relation to some users, the equipment code field is empty. In some embodiments this may indicate that the user is currently not using an end device. In column 230 a code representing what type of communication input device the user has associated with the end device they are using. Note that in relation to some users, the communication input device code field is empty. In some embodiments this may indicate that no communication input device is associated with the end device. In reference to FIG. 2, 'wc365' may represent a certain model of Web-camera. 'voip12' may represent a certain type of Voice over Internet Protocol phone. 'pc' may represent an IBM™ clone personal computer. 'mac' may represent a Macintosh™ personal computer. In column 240 a communication input device code is shown. In this particular embodiment the communication input device code is shown as the communication input device's IP address, though other identifiers are possible.

In column 250 the television data stream which is being received by the end device being used by the user is stored. This information may be obtained by the IIS 160 through monitoring and/or querying the TDS 150. Note that in relation to some users, the communication input device code field is empty. In some embodiments this may indicate, as above, that the user is currently not using an end device. In this particular embodiment the television data stream is identified by an alpha-numeric code. Other types of identifiers are possible within the scope of the invention.

In column 260, identifier codes of related users are listed. These identifier codes may be related to the user represented by the identifier code in column 210 because the user directed the IIS 160 to store identifier codes for the related users. These related users may be people for whom the user wishes to know which television data stream they are watching, or when they are watching the same television data stream as the user. In column 270, equipment codes of the end device being used by the related users may be stored. Note that in relation to some related users, this field may be empty because the user is not currently using an end device to receive a television data stream. In some embodiments, fewer or more types of data columns may be present, or the data may be stored in some other format, possibly a database format known in the art. For instance, in some embodiments, column 270 may not be present as the data contained therein is merely repetitive of data stored elsewhere in the data store. Namely, the related equipment code in column 270 can be found in column 220 in reference to the primary user whose identifier code is found in column 210.

In further reference to FIG. 2, certain information has been bolded for explanatory reasons. Note that one of the related identifier codes for identifier code '0052' is '0058.' In some embodiments of the invention, '0058' may be stored at the direction of the '0052' user. '0058' may represent a user for whom the '0052' user wishes to know which television data stream they are watching, or when they are watching the same television data stream as the '0052' user. In embodiments where the system or method only informs a user when another specified user is receiving the same television data stream, the system or method may not take any action in the state represented by FIG. 2. In other embodiments, where the system or method allows a user to determine what television data stream another user is receiving, the '0052' user may be able to interact with an end device to receive a video and/or audio representation of which television data stream is being received by '0052''s related users.

In the example shown by FIG. 2, such a system or method would allow the '0052' user to possibly call up a list of the television data stream being received by end devices being used by the '0144' user, the '5280' user, the '0069' user, the '1234' user, and the '0058' user. In the specific case of the '0058' user, the end device being used by the '0052' user may display a notification that the '0058' user is watching the 'RMRCABC109' television data stream. Some embodiments may conduct a lookup of a name associated with the related user's identifier code and display the name rather than the identifier code. For instance, 'Seymore B. McCluckey' may be displayed rather than '0058' if that is the name of the user represented by '0058.' Some embodiments may also conduct a lookup of a name associated with the television data stream, and display the name rather than the alpha-numeric representation of the television data stream. For instance, 'ABC™' may be displayed rather than 'RMRCABC109' if that is the name of the traditional television station converted into television data stream 'RMRCABC109.' Furthermore, in some embodiments, another lookup may be conducted where the content of the television data stream is determined so a description of such may be displayed. In some embodiments this may be the specific television program that is being transmitted in the television data stream. So in some embodiments, for example, the following might be displayed when user '0052' requests information on what user '0058' is watching: "Seymore B. McCluckey—ABC—National Nightly News." The lookups described above may occur at a variety of systems or some combination thereof. For example, the IIS 160 may conduct user name lookups, but the IIS 160 may communicate with the TDS 150 to conduct a television data stream name and program information lookup.

Figure 3:
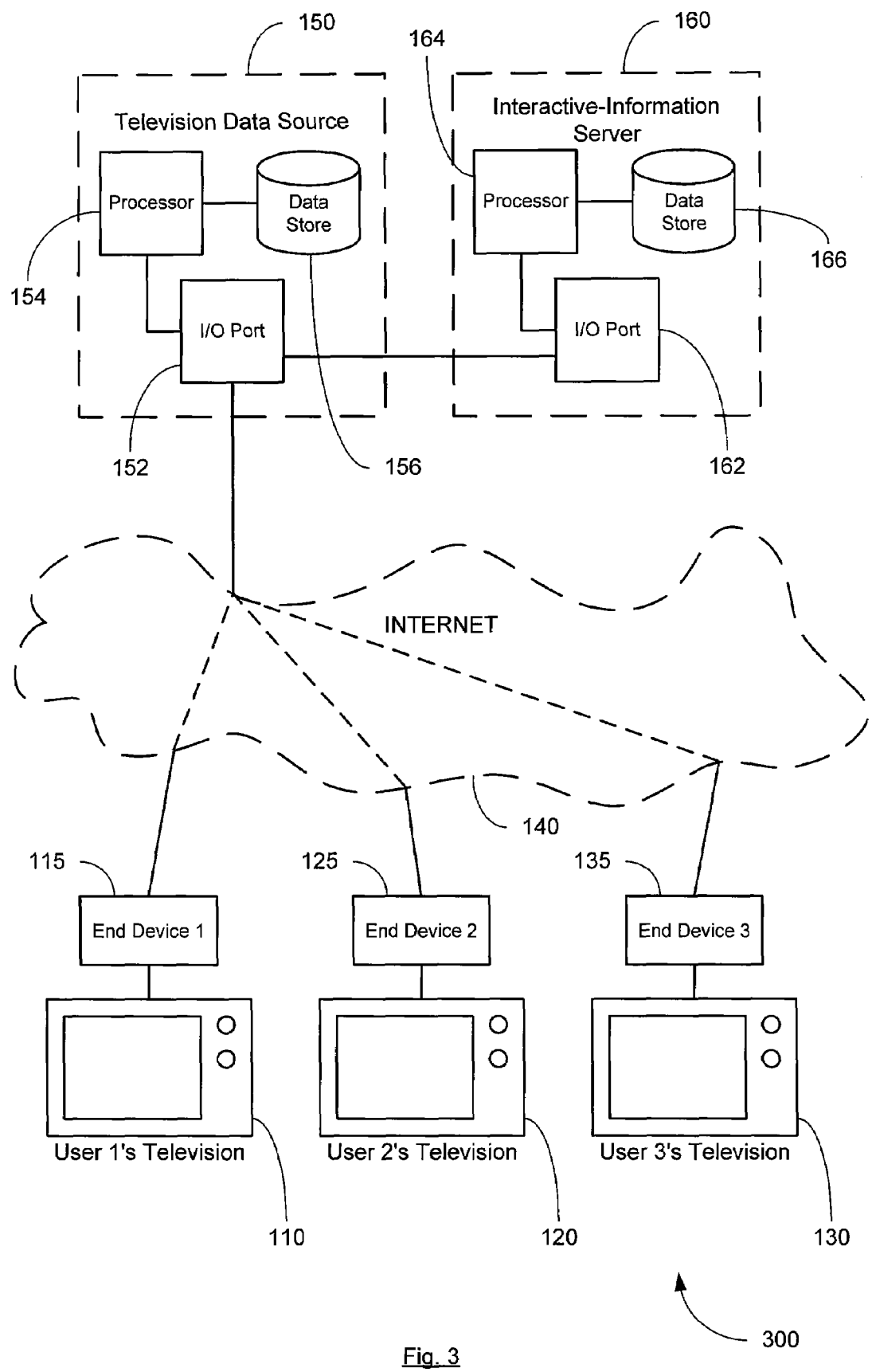
FIG. 3 is a block diagram of a system similar to that in FIG. 1, except the television data source and the interactive-information server are in direct communication.

FIG. 3 is a block diagram of a system 300 similar to that in FIG. 1, except the TDS 150 and the IIS 160 are in direct communication. The embodiment may be advantageous when the IIS 160 and the TDS 150 are in close physical proximity to each other or are operated by the same entity. In such a configuration, the IIS 160 will communicate with the TDS 150 by use of a trunk connection or other connection to monitor which television data stream is being transmitted to each of the plurality of users so monitored.

Figure 4:
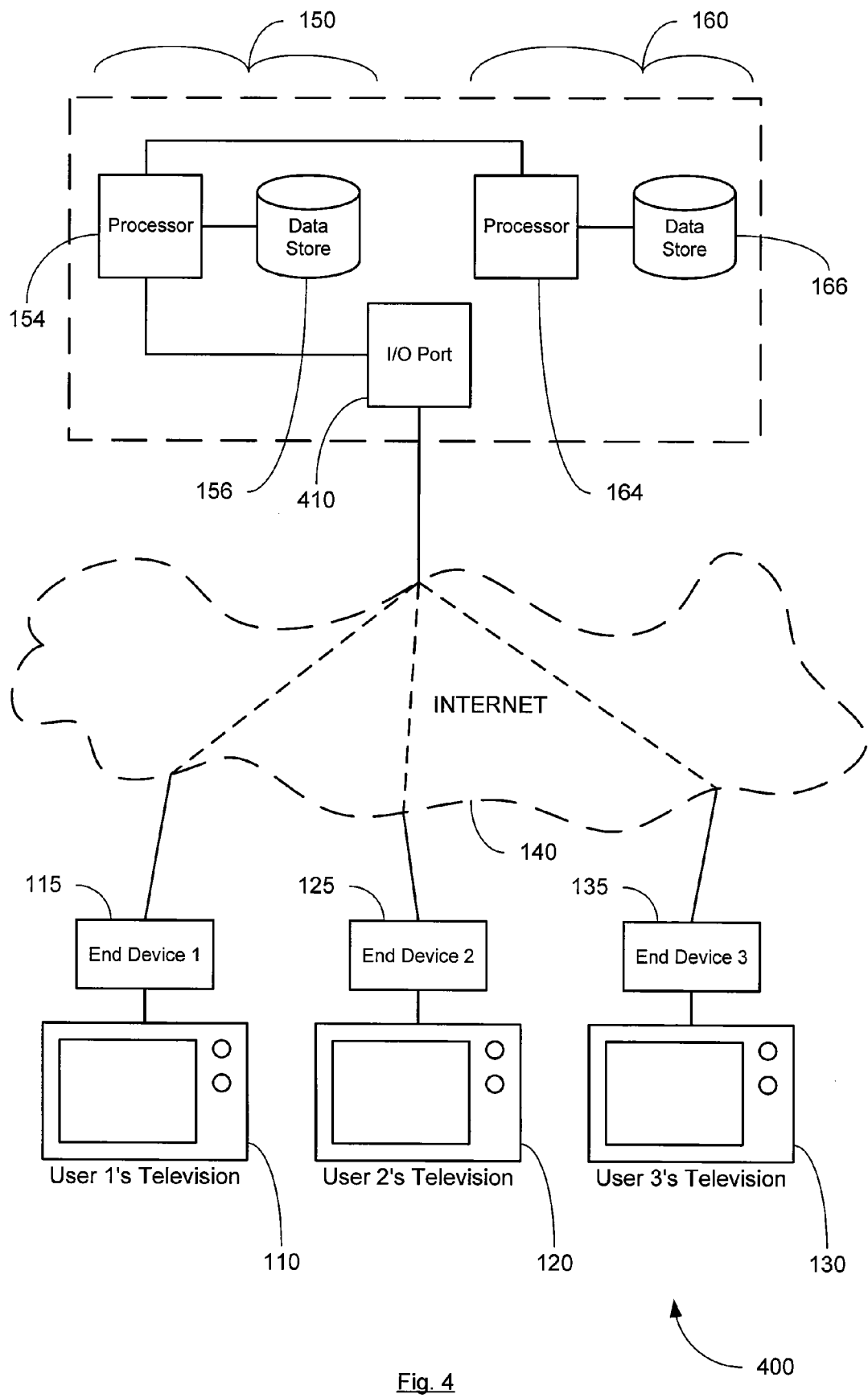
FIG. 4 is a block diagram of a system similar to that in FIG. 3, except the television data source and the interactive-information server are subsystems of a larger system.

FIG. 4 is a block diagram of a system 400 similar to that in FIG. 3, except the television data source and the interactive-information server are subsystems of a larger system. For the same reasons described above or otherwise, it may be advantageous in some embodiments to combine the TDS 150 and IIS 160 as subsystems of a larger system as shown in FIG. 4. In such a configuration, the TDS 150 and IIS 160 may share the same input and output port 310.

Figure 5:
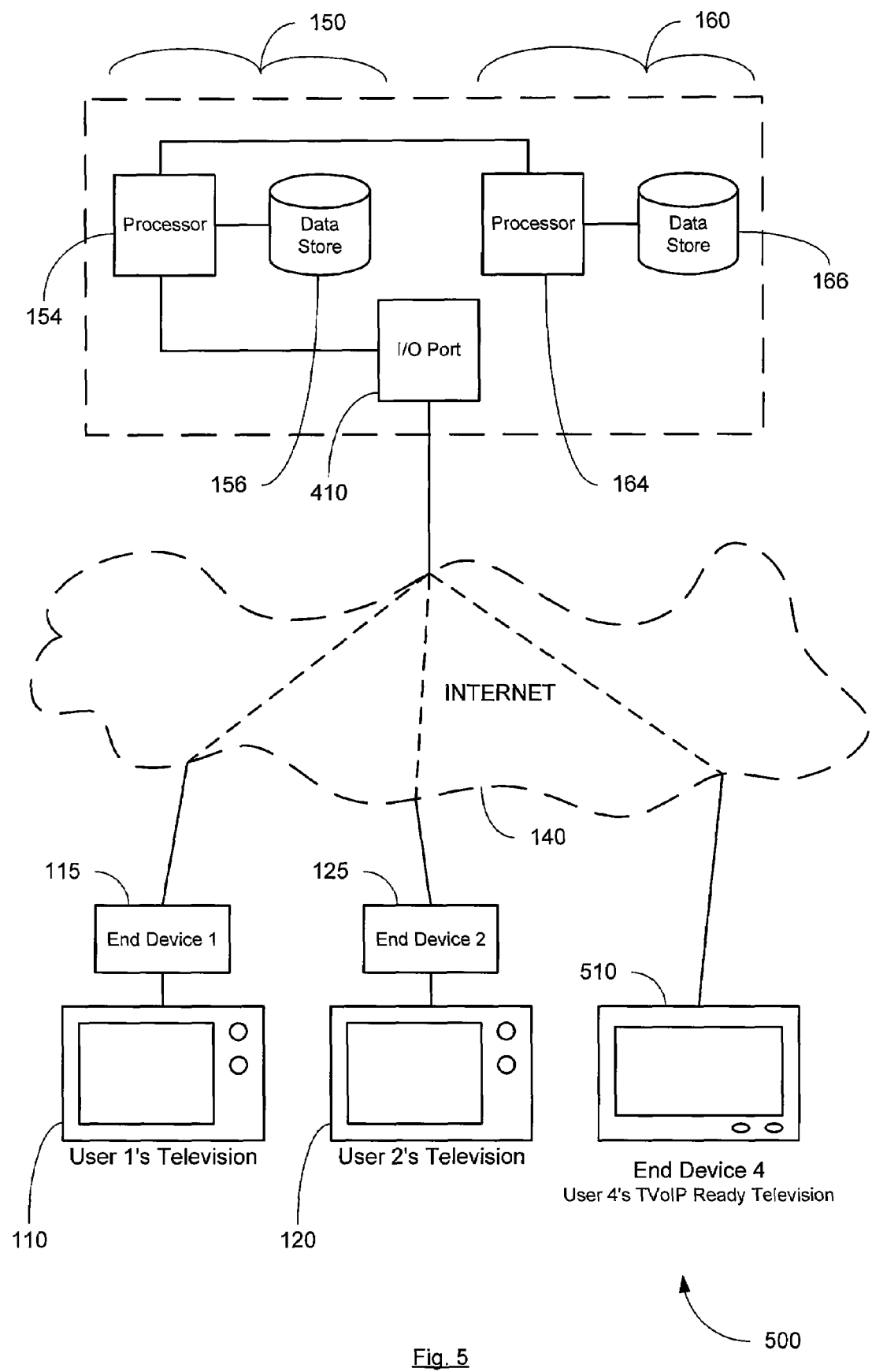
FIG. 5 is a block diagram of a system similar to that in FIG. 4, except one of the televisions and end devices has been replace with a TVoIP ready television.

FIG. 5 is a block diagram of a system 500 similar to that in FIG. 4, except end device 135 and television 130 have been replaced by a fourth end device 145, here a TVoIP ready television. In this embodiment, the TVoIP ready television may incorporate the functionality of the end device 135 and the television 130 within one physical unit.

Figure 6:
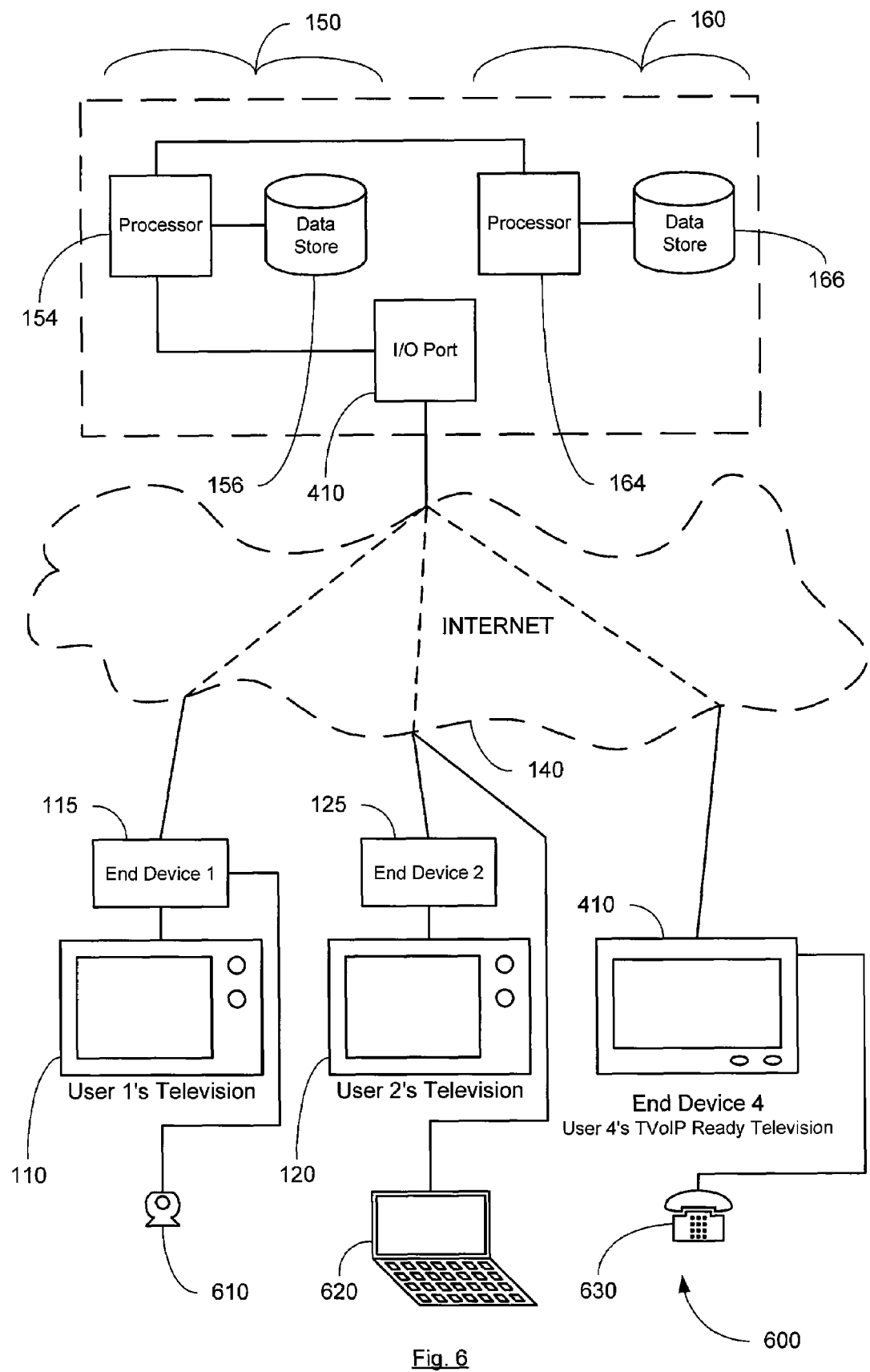
FIG. 6 is a block diagram of a system similar to that in FIG. 5, except each end device has an associated communication input device.

FIG. 6 is a block diagram of a system 600 similar to that in FIG. 5, except each end device has an associated communication input device. A communication input device 610 is shown in communication with end device 115. In FIG. 6, the communication input device 610 is shown as a web-camera. In some embodiments, the communication input device 610 may be in direct communication with the end device 115, and facilitate communication with another end device or communication input device associated with a different end device.

A communication input device 620 is shown associated with, but not in direct communication with, end device 125. In FIG. 6, the communication input device 620 is shown as a laptop or notebook computer. In some embodiments, the communication input device 620 may be more directly in communication with the Internet than with the end device 125, and facilitate communication with another end device or communication input device associated with a different end device.

A communication input device 620 is shown associated with, but not in direct communication with, end device 410. In FIG. 6, the communication input device 630 is shown as a Voice over Internet Protocol telephone. As shown in this embodiment, the communication input device 630 may be in direct communication with the internet. In other embodiments the communication input device 630 may be more directly in communication with the Internet than with the end device 135, and facilitate communication with another end device or communication input device associated with a different end device.

Figure 7:
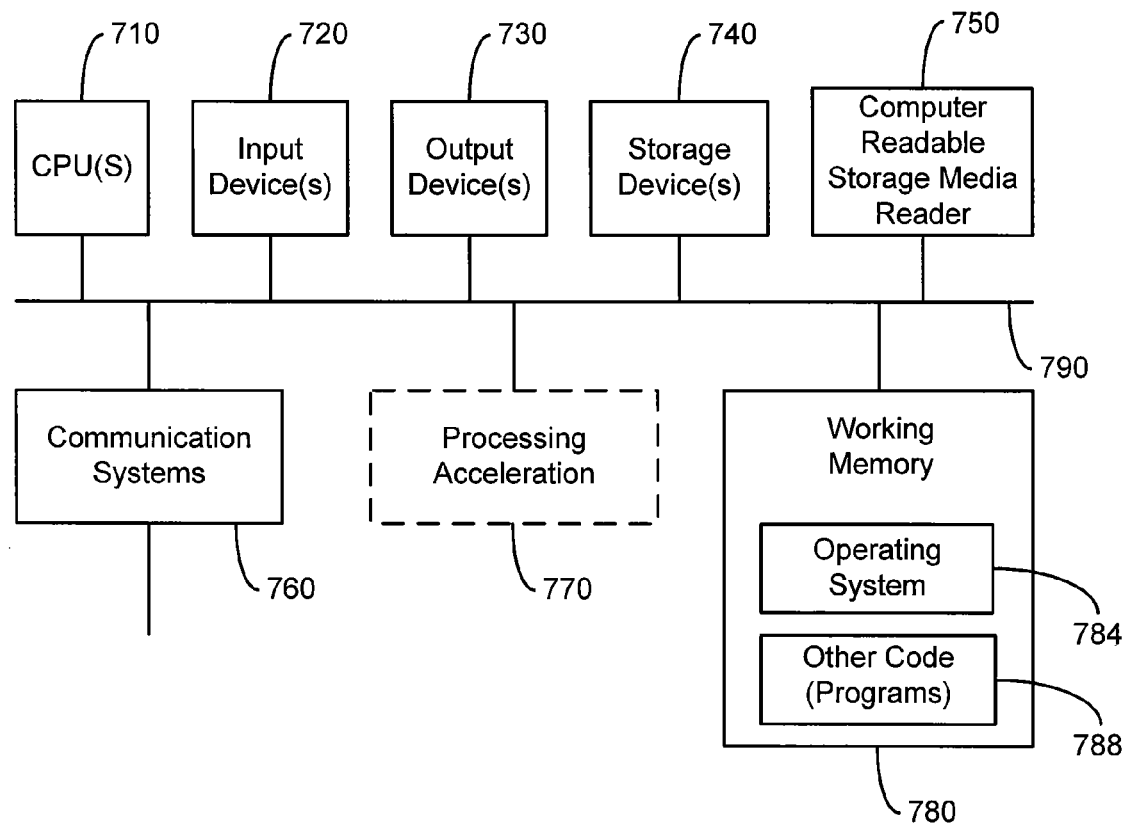
FIG. 7 is a block diagram of an exemplary computer system capable of being used in at least some portion of the systems of the present invention, or implementing at least some portion of the methods of the present invention.

FIG. 7 is a block diagram illustrating an exemplary computer system 700 in which at least portions of embodiments of the present invention may be implemented. This example illustrates a computer system 700 such as may be used, in whole, in part, or with various modifications, to provide the functions of the TDS 150, IIS 160, End Devices 115, 125, 135, 410, communication input devices 610, 620, 630 and/or other components of the invention such as those discussed above. For example, various functions of the IIS 150 may be controlled by the computer system 700 including, merely by way of example, monitoring television data streams being transmitted and/or notifying users of what television data stream another user is receiving.

The computer system 700 is shown comprising hardware elements that may be electrically coupled via a bus 790. The hardware elements may include one or more central processing units 710, one or more input devices 720 (e.g., a mouse, a keyboard, etc.), and one or more output devices 730 (e.g., a display device, a printer, etc.). The computer system 700 may also include one or more storage device 740. By way of example, storage device(s) 740 may be disk drives, optical storage devices, solid-state storage device such as a random access memory ("RAM") and/or a read-only memory ("ROM"), which can be programmable, flash-updateable and/or the like.

The computer system 700 may additionally include a computer-readable storage media reader 750, a communications system 760 (e.g., a modem, a network card (wireless or wired), an infra-red communication device, a Bluetooth™ device, etc.), and working memory 780, which may include RAM and ROM devices as described above. In some embodiments, the computer system 700 may also include a processing acceleration unit 770, which can include a digital signal processor, a special-purpose processor and/or the like.

The computer-readable storage media reader 750 can further be connected to a computer-readable storage medium, together (and, optionally, in combination with storage device(s) 740) comprehensively representing remote, local, fixed, and/or removable storage devices plus storage media for temporarily and/or more permanently containing computer-readable information. The communications system 760 may permit data to be exchanged with a network, system, computer, and/or other component described above.

The computer system 700 may also comprise software elements, shown as being currently located within a working memory 780, including an operating system 784 and/or other code 788. It should be appreciated that alternate embodiments of a computer system 700 may have numerous variations from that described above. For example, customized hardware might also be used and/or particular elements might be implemented in hardware, software (including portable software, such as applets), or both. Furthermore, connection to other computing devices such as network input/output and data acquisition devices may also occur.

Software of computer system 700 may include code 788 for implementing any or all of the function of the various elements of the architecture as described herein. For example, software, stored on and/or executed by a computer system such as system 700, can provide the functions of the TDS 150, IIS 160, End Devices 115, 125, 135, 410, communication input devices 610, 620, 630 and/or other components of the invention such as those discussed above. Methods implementable by software on some of these components will be discussed below in more detail.

Figure 8:
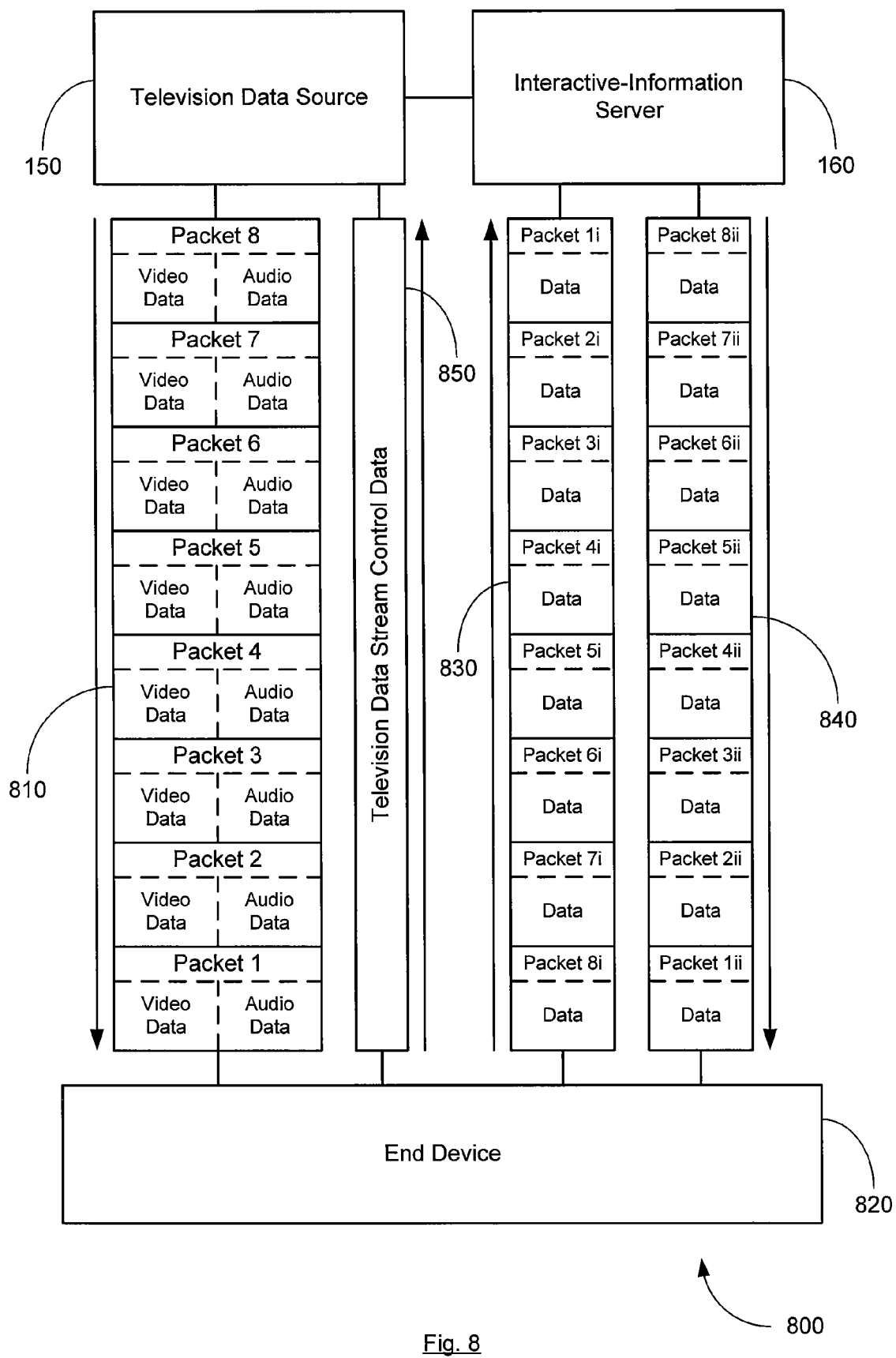
FIG. 8 is a diagram of a television data stream being transmitted by a television data source to an end device and a parallel stream of notification data being transmitted from an interactive-information server to the end device.

FIG. 8 is a diagram 800 of a television data stream 810 being transmitted by a TDS 150 to an end device 820, an outward stream of data 830 being transmitted from end device 820 to an IIS 160, and an inward stream of data 840 being transmitted from IIS 160 to end device 820. This embodiment also shows a television data stream control instruction 850 being transmitted by end device 820 to TDS 150.

Television data stream 810 may consist of multiple consecutive packets of data, for example, packets 1 through 8 as shown on FIG. 8. Each packet may contain both audio and video data. End device 820 may convert television data stream 820 into audio and video signals for transmission to another device such as a television. In other embodiments, the end device may be a personal computer or TVoIP ready television, and may itself more directly reproduce the video and audio represented by the television data stream 810.

Television Data Stream Control Instruction 850 may be an intermittent signal sent from end device 820 to TDS 150 when a user initiates a change in television data streams that the user wishes to receive. For example, a user may push a button a remote control device associated with end device 820 to initiate a change in which television data stream 810 is being sent to end device 820. The end device may be configured to receive the signal from the remote control and send a television data stream control instruction 850 to TDS 150. TDS 150 may then change which television data stream 810 is being transmitted to end device 820.

In embodiments where IIS 160 queries end devices to determine when television data stream 810 is being received by the end devices, outward stream of data 830 may be data requested by IIS 160 which represents what television data stream 810 end device 820 is receiving. In embodiments where IIS 160 communicates more directly with TDS 150 to determine which television data stream 810 a particular end device 820 is receiving, outward stream of data 830 may be communication information transmitted by a communication input device associated with end device 820. Outward stream of data 830 may also be instructions from end device 820 to IIS 160 to transmit information representing what television data streams are being received by other users. Incoming stream of data 840 may be representative of such information, or may also be notification data regarding when a specified user of another end device is receiving the same television data stream 810 as the user of end device 820.

Figure 9:
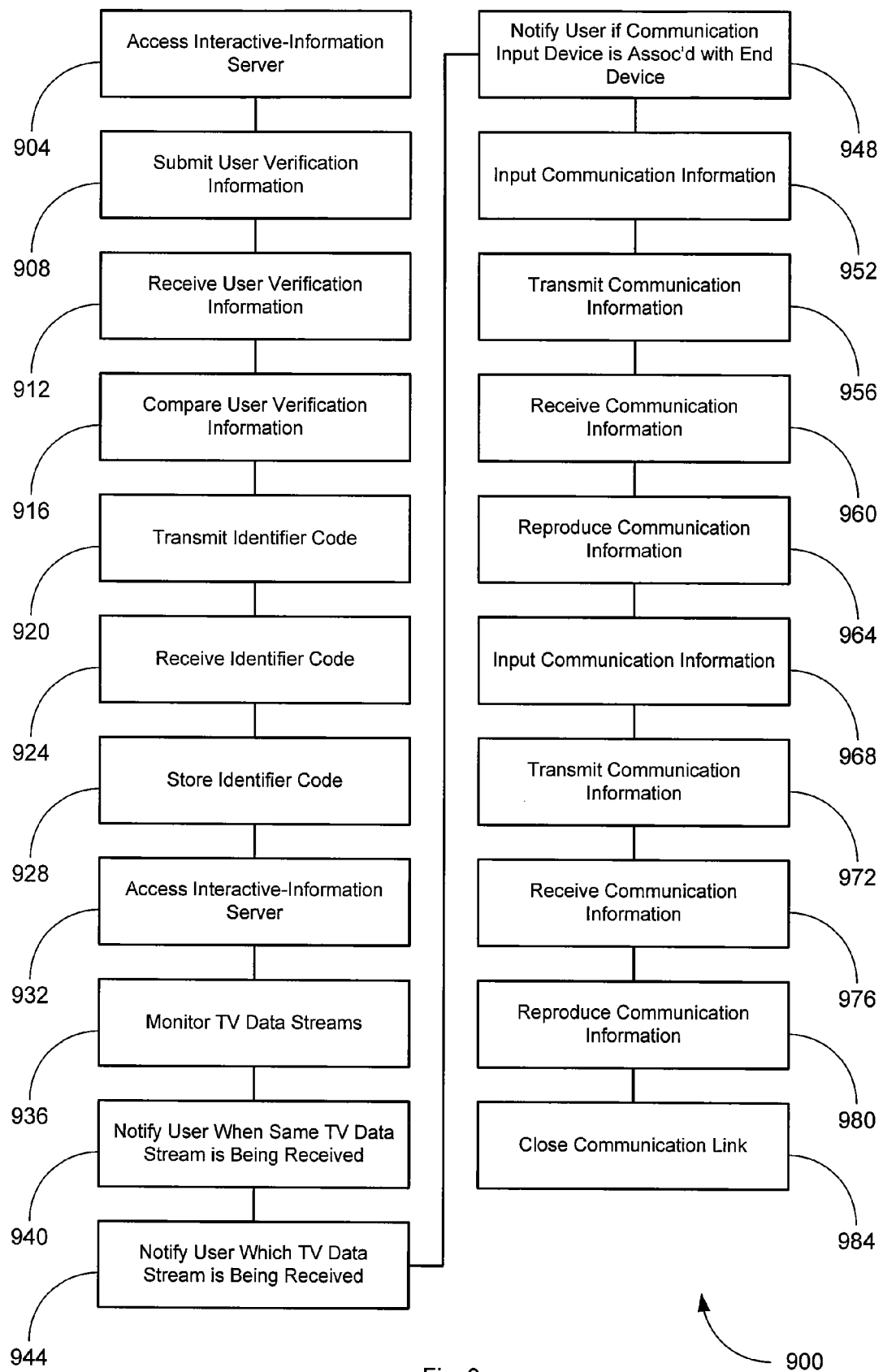
FIG. 9 is a diagram of a method of providing social interaction opportunities for people watching television which allows users to use communication input devices and notifies a user when the same television data stream is being received by another end device, what television data streams are being received by other end devices, and whether or not a particular end device has a communication input device associated with it.

FIG. 9 is a diagram of a method 900 of providing social interaction opportunities for people watching television which allows users to use communication input devices and notifies a user when the same television data stream is being received by another end device; what television data streams are being received by other end devices; whether or not a particular end device has a communication input device associated with it; and also allows users of end devices to communicate with each other. At block 904, a user accesses IIS 160. The use then submits user verification information such as a username and password at block 908. At block 912, IIS 160 receives the user verification information. IIS 160 compares the user verification information to information stored in a data store at or in communication with IIS 160 at block 916. The stored information may be information collected from the user during initiation of services with a service provider. The user may be able to modify the user verification information in some embodiments to personalize the verification procedure.

At block 920, the user submits an identifier code of another user whom the user wishes to know when they are receiving the same television data stream and/or what television data stream they are receiving. IIS 160 receives the identifier code at block 924 and stores the identifier code at block 928.

At block 932, the user may access IIS 160. This may occur automatically when the user of accesses TDS 150 with an end device and instructs TDS 150 to transmit a television data stream. In some embodiments, the user may be required to log into the end device, possibly using an input mechanism which instructs IIS 160 that the specific user is using the end device. In other embodiments, the IIS 160 may determine that a specific user is using the end device because of what television data stream the end device is receiving and the habitual television data stream receiving tendencies of the user in the past. In some embodiments, the end device may be associated with only one user (a single person household), and thus when an end device is in use, IIS 160 may know that the end device is being used by that user.

At block 936, IIS 160 may monitor which television data stream is being received by the user and the associated users represented by the identifier codes transmitted by the user at block 920. IIS 160 may notify the user when an associated user's end device is receiving the same television data stream at block 940. In some embodiments, at block 944, in response to a user requesting such information, IIS 160 may transmit information representative of which television data streams are being received by associated end devices. Possibly, IIS 160 may transmit this information whenever a user first initiates use of an end device. The end device may then reproduce this information as video or audio information receivable by the user from the end device or a device associated therewith. At block 948, some embodiments of the invention will notify the user if a communication input device is associated with an associated end device.

At block 952, if the user has a communication input device associated with the end device being used, the user may input communication information for transmission to another end device or communication input device associated with another end device at block 956. The other end device or communication input device may receive the communication information at block 960, and reproduce such information using video or audio at block 960. The user using the other end device or communication input device may then respond in kind or otherwise at blocks 968, 972, 976, 980. This process may repeat itself as the users communicate back and forth until such time as either one or both of the users close the communication link at block 984.

Figure 10:
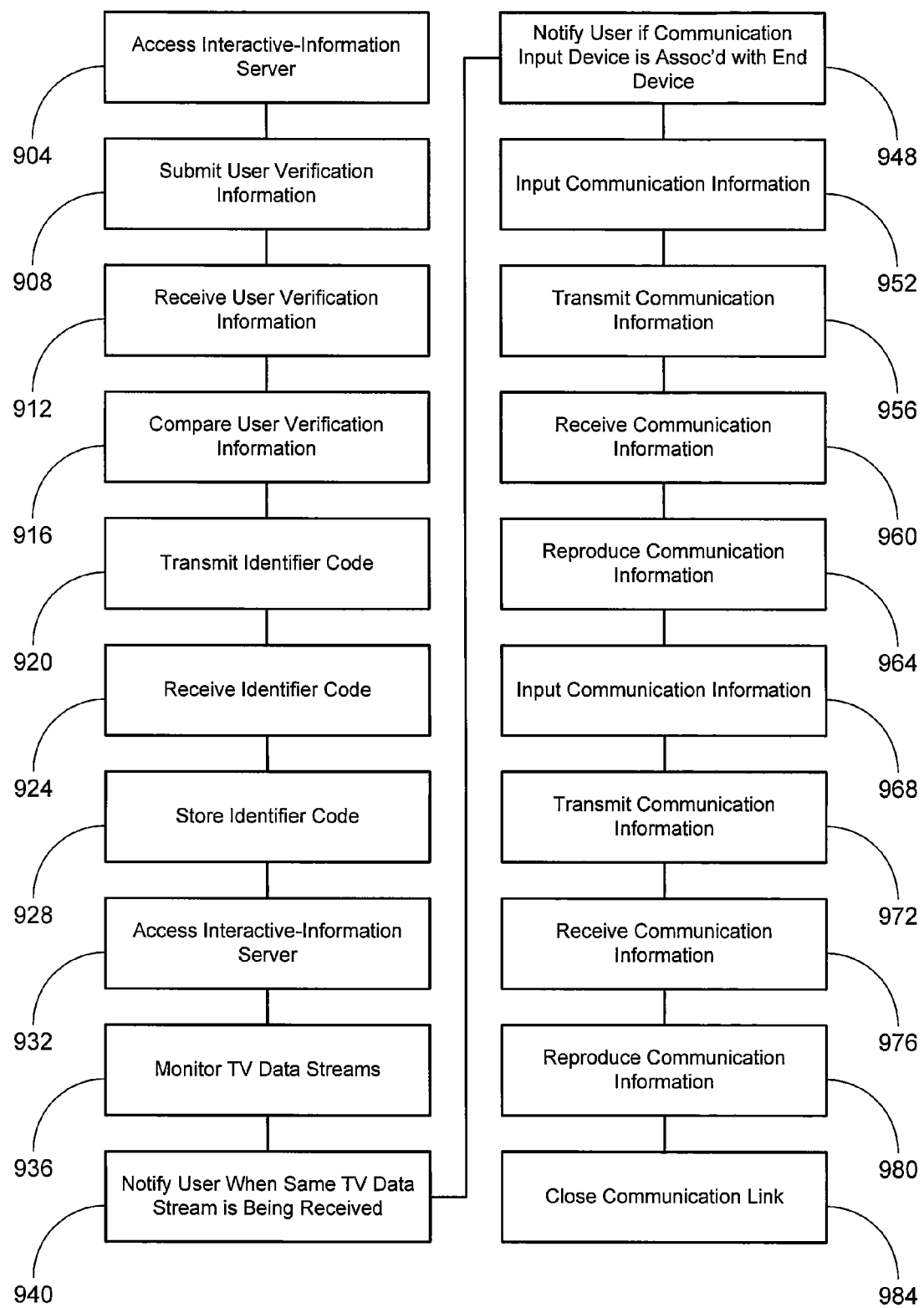
FIG. 10 is a diagram of a method, similar to the method in FIG. 9, which does not notify a user of which television data streams are being received by other end devices which are not receiving the same television data stream.

FIG. 10 is a diagram of a method 1000, similar to the method in FIG. 9, which does not notify a user of which television data streams are being received by other end devices which are not receiving the same television data stream.

Figure 11:
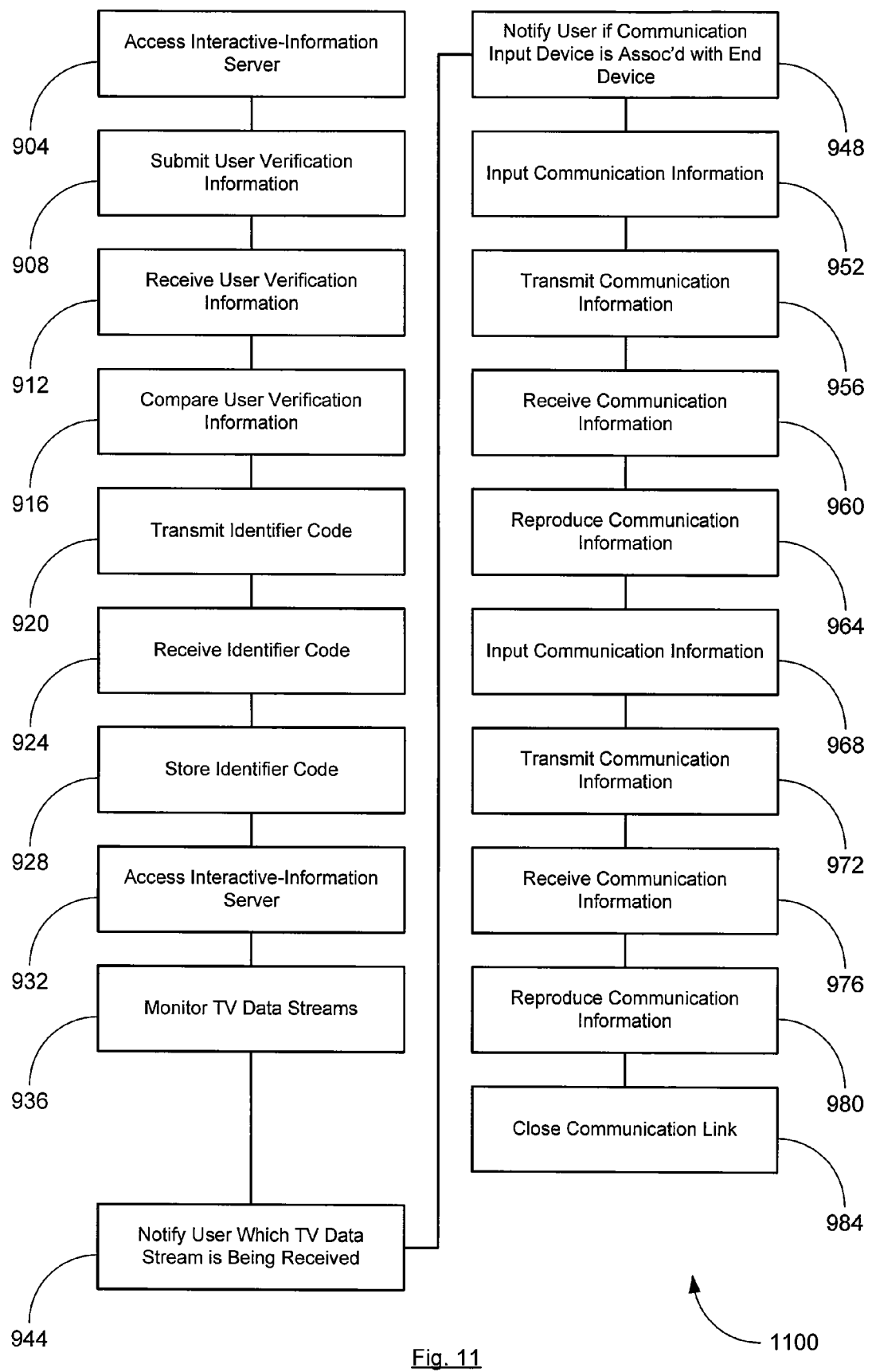
FIG. 11 is a diagram of a method, similar to the method in FIG. 9, which does not notify a user when the same television data stream is being received by another end device.

FIG. 11 is a diagram of a method 1100, similar to the method in FIG. 9, which does not notify a user when the same television data stream is being received by another end device.

Figure 12:
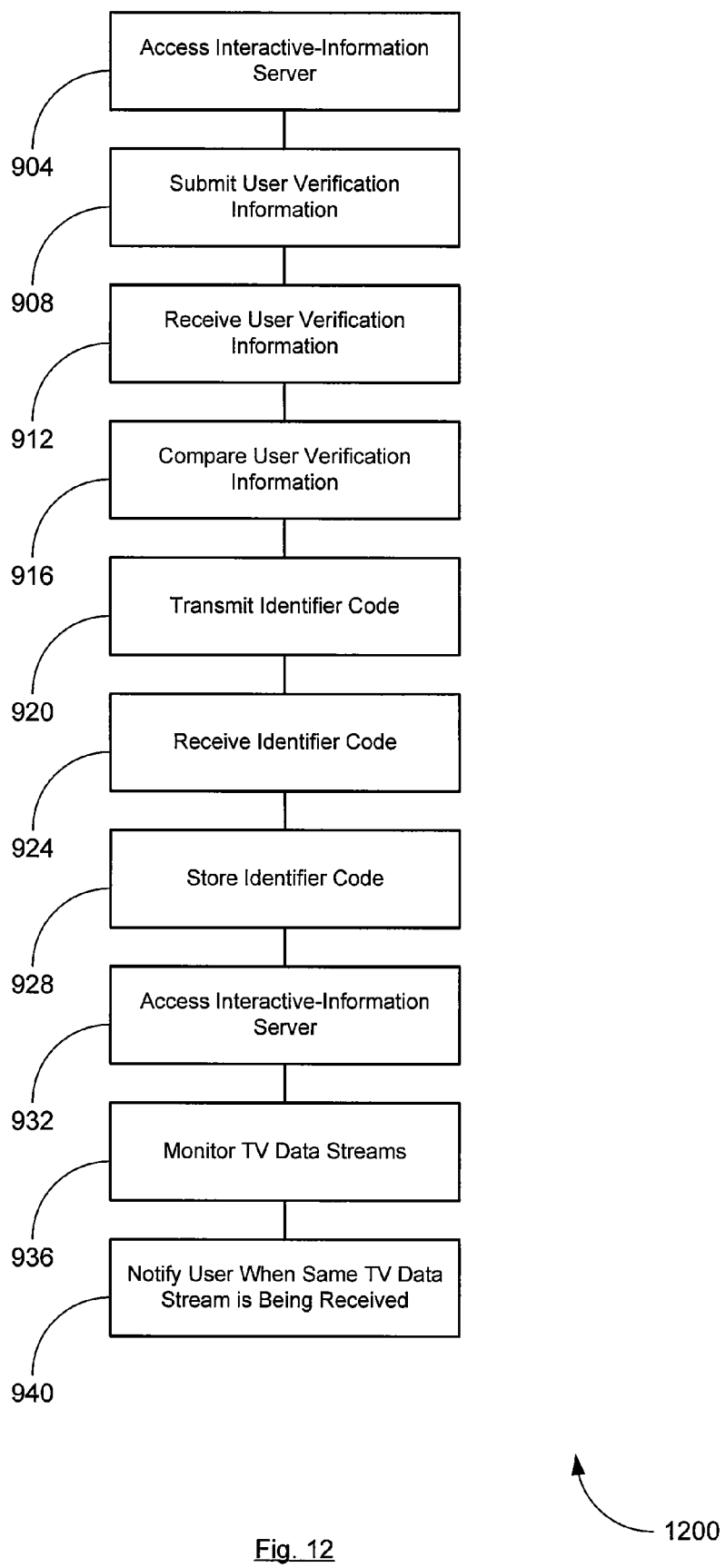
FIG. 12 is a diagram of a method, similar to the method in FIG. 9, which does not notify a user which television data streams are being received by another end device and which does not allow users to use communication input devices.

FIG. 12 is a diagram of a method 1200, similar to the method in FIG. 9, which does not notify a user which television data streams are being received by another end device and which does not allow users to use communication input devices.

Figure 13:
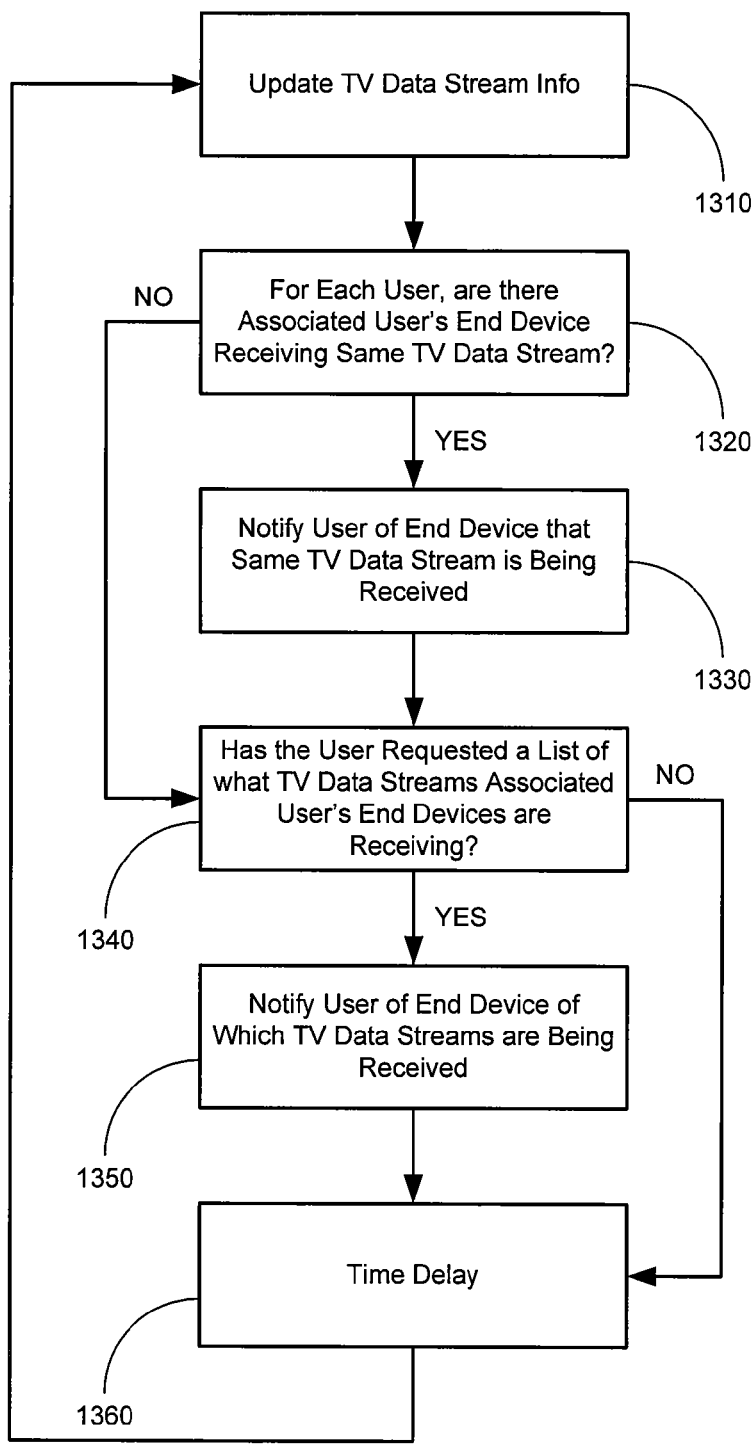
FIG. 13 is a flow diagram of a process that might be used by the interactive-information server, or other portion of the system, to determine when to notify a user than another end device is receiving the same television stream, or to determine when to notify the user of which television data streams are being receives by other end devices.

FIG. 13 is a flow diagram of a process 1300 that might be used by the interactive-information server, or other portion of the system, to determine when to notify a user than another end device is receiving the same television stream, or to determine when to notify the user of which television data streams are being receives by other end devices. At block 1310, an IIS 160 may update its data store which reflects which users are using which end devices and what television data streams are being received by each end device. This may occur because a TDS 150 transmits information to IIS 160 whenever this information changes, or it may occur because IIS 160 queries either TDS 150 or end devices. At block 1320, IIS 160 determined whether for each user there is an associated user who's end device is receiving the same television data stream as the user. If yes, at block 1330, IIS 160 may notify the user that the same television data stream is being received by another user. If no, or after notifying the user that the associated user's end device is receiving the same television data stream, IIS 160 will determine, at block 1340, whether or not a user has requested a list of what television data streams associated user's end devices are receiving. In some embodiments the user may merely request information regarding what a particular user's end device is receiving. If a user has requested such information, at block 1350 IIS 160 will notify the user of which television data stream is being received by the associated user's end device. If no request has been made, or after such notification has been made, at block 1360 a time delay may occur at IIS 160 before the process 1300 repeats itself. In some embodiments, a time delay may not occur, for example in those embodiments where IIS 160 is not querying other systems, but rather receives information as it changes elsewhere in the invention. In such embodiments, IIS 160 may conduct the described process whenever updated information is received.

The invention has now been described in detail for the purposes of clarity and understanding. However, it will be appreciated that certain changes and modifications may be practiced within the scope of the appended claims.

What is claimed is:

1. A system for providing social interaction opportunities for people watching television, the system comprising:
   a television data source configured to transmit at least one of a plurality of television data streams for reception by a plurality of end devices, wherein each end device is represented by an equipment code;
   the plurality of end devices, including a first end device used by a first user and a second end device used by a second user, wherein each end device is configured to receive at least one of the plurality of television data streams, and each user is represented by an identifier code; and
   an interactive-information server configured to:
      store, at the direction of the first user, an identifier code representing the second user;
      monitor which of the plurality of television data streams is being received by the first end device, by communicating with the television data source;
      monitor which of the plurality of television data streams is being received by the second end device, by communicating with the television data source;
      notify the first user when the same television data stream is being received by both the first end device and the second end device, wherein notifying the first user comprises:
         transmitting notification data regarding when the second user of the second end device is receiving the same television data stream as the first user of the first end device; and
         displaying a notification on the first end device that the second end device is receiving the same television data stream;

provide the first user with a video representation of which television data stream is being received by the second user, when the same television data stream is not being received by both the first end device and the second end device;

notify the first user if a second communication input device is associated with the second end device that is receiving a television data stream; and provide communications between a first communication input device that is associated with the first end device that is receiving a television data stream and the second communication input device that is associated with the second end device that is receiving a television data stream, wherein the first and second communication input devices are mobile phones.

2. The system for providing social interaction opportunities for people watching television of claim 1, wherein the interactive-information server is further configured to:

receive, from the first user, at least one identifier code associated with another user; and store the identifier code in a memory module.

3. The system for providing social interaction opportunities for people watching television of claim 2, wherein the interactive-information server is further configured to notify the second user when the same television stream is being received by both the first end device and the second end device.

4. The system for providing social interaction opportunities for people watching television of claim 3, wherein the interactive-information server is further configured to:

receive, in the first end device, communication information from the first user directed to the second user via the first communication input device;

transmit the communication information from the first end device to the second end device; and reproduce the communication information on a display associated with the second device.

5. The system for providing social interaction opportunities for people watching television of claim 4, wherein the interactive-information server is further configured to:

receive, in the second end device, communication information from the second user directed to the first user via the second communication input device;

transmit the communication information from the second end device to the first end device; and reproduce the communication information on a display associated with the first end device.

6. The system for providing social interaction opportunities for people watching television of claim 1, wherein the identifier code is an alpha-numeric string.

7. The system for providing social interaction opportunities for people watching television of claim 1, wherein the equipment code is an alpha-numeric string.

8. The system for providing social interaction opportunities for people watching television of claim 1, wherein the interactive-information server is selected from a group consisting of:

a computer in communication with the television data source; and a computer in communication with the plurality of end devices.

9. The system for providing social interaction opportunities for people watching television of claim 1, wherein the interactive-information server is further configured to:

determine the first end device is being used by the first user; and determine the second end device is being used by the second user.

10. The system for providing social interaction opportunities for people watching television of claim 1, wherein the interactive-information server is further configured to store information about the type of the communication input device associated with the second end device.

11. The system for providing social interaction opportunities for people watching television of claim 1, wherein the communication input device is configured to communicate with at least one end device which is not associated with the communication input device.

12. A system for providing social interaction opportunities for people watching television, the system comprising:

a television data source configured to transmit at least one of a plurality of television data streams for reception by a plurality of end devices, wherein each end device is represented by an equipment code;

the plurality of end devices, including a first end device used by a first user and a second end device used by a second user, wherein each end device is configured to receive at least one of the plurality of television data streams, and each user is represented by an identifier code; and an interactive-information server configured to:

store, at the direction of the first user, an identifier code representing the second end user;

monitor which of the plurality of television data streams is being received by the second end device, by communicating with the television data source;

notify the first user when the same television data stream is being received by both the first end device and the second end device, wherein notifying the first user comprises:

transmitting notification data regarding when the second user of the second end device is receiving the same television data stream as the first user of the first end device; and displaying a notification on the first end device that the second end device is receiving the same television data stream;

provide the first user with a video representation of which television data stream is being received by the second user, when the same television data stream is not being received by both the first end device and the second end device;

notify the first user if a second communication input device is associated with the second end device that is receiving a television data stream; and provide communications between a first communication input device that is associated with the first end device that is receiving a television data stream and the second communication input device that is associated with the second end device that is receiving a television data stream, wherein each of the communication input devices is a mobile phone.

13. The system for providing social interaction opportunities for people watching television of claim 12, wherein the interactive-information server is further configured to:

receive, from the first user, at least one identifier code associated with another user; and store the identifier code in a memory module.

14. The system for providing social interaction opportunities for people watching television of claim 13, wherein the interactive-information server is further configured to notify the second user when the same television stream is being received by both the first end device and the second end device.

15. The system for providing social interaction opportunities for people watching television of claim 12, wherein the interactive-information server is further configured to store information about the type of the communication input device associated with the second end device.

16. The system for providing social interaction opportunities for people watching television of claim 12, wherein the communication input device is configured to communicate with at least one end device which is not associated with the communication input device.

17. A computer implemented method of providing social interaction opportunities for people watching television, wherein the method comprises:
   storing, at the direction of a first user of a first end device, an identifier code representing a second user;
   monitoring which of a plurality of television data streams is being received by the first end device, by communicating with the television data source;
   monitoring which of the plurality of television data streams is being received by a second end device used by the second user, by communicating with the television data source;
   notifying the first user when the same television data stream is being received by both the first end device and the second end device, wherein notifying the first user comprises:
      transmitting notification data regarding when the second user of the second end device is receiving the same television data stream as the first user of the first end device; and
      displaying a notification on the first end device that the second end device is receiving the same television data stream;
   providing the first user with a video representation of which television data stream is being received by the second user, when the same television data stream is not being received by both the first end device and the second end device;
   notifying the first user if a second communication input device is associated with the second end device that is receiving a television data stream; and
   providing communications between a first communication input device that is associated with the first end device that is receiving a television data stream and the second communication input device that is associated with the second end device that is receiving a television data stream, wherein each of the communication input devices is a mobile phone.

18. The computer implemented method of providing social interaction opportunities for people watching television of claim 17, wherein the method further comprises the first user transmitting communication information to the communication input device associated with the second end device via the first communication input device.

* * * * *